United States Patent [19]

Hill

[11] Patent Number: 4,607,346

[45] Date of Patent: Aug. 19, 1986

[54] APPARATUS AND METHOD FOR PLACING DATA ON A PARTITIONED DIRECT ACCESS STORAGE DEVICE

[75] Inventor: Reed A. Hill, San Jose, Calif.

[73] Assignee: International Business Machines Corporation, Armonk, N.Y.

[21] Appl. No.: 479,384

[22] Filed: Mar. 28, 1983

[51] Int. Cl.[4] .............................................. G06F 12/00
[52] U.S. Cl. ................................................... 364/900
[58] Field of Search ... 364/200 MS File, 900 MS File

[56] References Cited

U.S. PATENT DOCUMENTS

| 3,938,096 | 2/1976 | Brown et al. | 364/200 |
| 4,276,594 | 6/1981 | Morley | 364/200 |
| 4,300,192 | 11/1981 | Couleur et al. | 364/200 |
| 4,371,929 | 2/1983 | Brann et al. | 364/200 |

Primary Examiner—Thomas M. Heckler
Attorney, Agent, or Firm—Shelley M. Beckstrand; Henry E. Otto, Jr.

[57] ABSTRACT

A storage device, such as a direct access storage device, is partitioned into a plurality of partitioned devices having different access and storage characteristics matched to the required perforamnce. Data may be stored on that partitioned device which most nearly meets the storage characteristics of the data, where the access and storage characteristics of data are related to its volume and frequency of access.

11 Claims, 11 Drawing Figures

FLOW DIAGRAM FOR DATA PLACEMENT

LOGIC TO DETERMINE ACCESS DENSITY FOR
TWO PARTITIONS

APPARATUS AND METHOD FOR PLACING DATA ON A PARTITIONED DIRECT ACCESS STORAGE DEVICE

BACKGROUND OF THE INVENTION

1. Field of the Invention

This invention relates to method and means for storing digital data. More specifically, it relates to the storage of digital data in a partitioned direct access storage device.

2. Description of the Prior Art

A significant problem in the storage of digital data on direct access storage devices is characterized as "device bottleneck." That is, when a storage device receives access requests from a processor at a faster rate than the device can sustain, the processor is forced to wait. This results, in many cases, in a catastrophic degradation of throughput: the rate at which data records are stored on or retrieved from data sets on the device.

One strategy implemented at some computer installations for managing device bottleneck is to have a person, usually a data base administrator, "manually" examine the device (that is, scan the contents of the device), and select for removal to other devices sufficient data sets so that accesses to the data sets remaining on the device will not exceed the device capacity.

Another strategy for managing device bottleneck implemented by some application programs is to allocate to a data set much more physical space on a device than is required. The space allocated in excess of requirements is, therefore, not written with data by this or other programs, with a resulting decrease in demand on the device from other applications which would, except for the excess allocation, be accessing additional data on the device.

It is recognized, additionally, that by placing data on adjacent tracks of a direct access storage device a faster rate of access can be achieved due to the shorter seek times required. Thus, a data base administrator may allocate physical space on a device to a given data set or group of data sets at one time. However, this strategy for increasing the access rate to data is only effective if there is either no or little competition for access to data residing in other areas of the device.

When a plurality of data storage devices are available, having different access characteristics (such as disk and tape storage devices), it is known to allocate frequently used data to the disks, which are faster, and less frequently used data to the tapes, which are slower. A further approach to the problem of bottlenecks provides an interface unit, including buffer storage and a control processor, which queues data for transfer with respect to a central processor and a plurality of storage devices of varying characteristics.

Generally, however, the storage of data is defined by the user of the system. He prescribes where the data will be placed. Unable to predict the use of data with sufficient precision, the user frequently places data in such a way that the storage device is unable to provide the required number of accesses during periods of peak demand by the central processor, resulting in excessive response times and overall system degradation. This results in considerable effort on the part of the user to tune his system or, in other words, to rearrange his stored data to relieve the excessive access burden on a particular device or set of devices. In the case where the user has several different kinds of storage devices that have different access rates and/or storage capacities, he will attempt, on an intuitive basis, to place the data sets on devices that more nearly provide the performance required, and when using devices that are not well matched to this requirement, he will over allocate space in an attempt to assure a sufficient access rate to a particular data set. Thus, even while not effectively accomplished, a great deal of effort by highly skilled personnel is required to place data sets and to monitor system performance. If data storage capacity is not used effectively (resulting in wasted storage capacity and/or access capability), the data storage system generally operates in a degraded mode with human intervention occurring when degradation becomes intolerable, and data sets frequently are not placed on devices that most nearly meet the access and storage characteristics of the data.

Further, storage devices, which have a relatively narrow range of capability, are being called upon to meet a wide range of demands. In the case of direct access storage devices, there is little freedom to modify the storage capacity or to vary the number of accesses that can be sustained in a given period of time. This results in the storage of data in such a way that the access rates that are required cannot be met or the storage capacity that is available cannot be used if the data to be stored requires a sufficiently different rate of access per unit of capacity than the device is able to provide. In one case, for example, if the accesses per unit of time for each unit of capacity of the storage device exceeds the access rate for each unit of capacity of the data set to be stored the access capability of the device will be under utilized. In the other case, where the access rate per unit volume of data is greater than the access rate per unit volume of storage capacity of the storage device that will provide storage for that data, the device will either be unable to provide the accesses required or the storage capacity cannot be fully utilized. In either case, the cost effectiveness of the storage device is reduced and in the case where sufficient accesses cannot be provided, there is a degradation of the data processing system in terms of throughput and response time.

SUMMARY OF THE INVENTION

In accordance with the invention, apparatus and method are provided for partitioning a storage device, such as a direct access storage device, into a plurality of devices having different access and storage characteristics matched to the required performance.

In accordance with a further aspect of the invention, an apparatus and method is provided for the automatic placement of data on that partitioned device which substantially meets the storage characteristics of the data, where the storage characteristics of data are related to its volume and frequency of access.

In accordance with the method of the invention, a computing apparatus is operated to partition a storage device into a plurality of logical devices, the method including the steps of: calculating the access density of the storage device as equal to the total access per unit of time sustainable by the storage device divided by the total storage capacity of the storage device; determining for each of a plurality of data sets to be stored on said storage device a data set access density equal to the total accesses per unit of time to be made to that data set divided by the volume of data allocated to a data set;

allocating the data sets to at least two groups based upon their access densities, and assigning to each group an access density value related to the access densities of the assigned data sets; partitioning the device into a plurality of logical devices of different access densities, where the sum of the access densities of the logical devices equals the access density of the storage device; and assigning each of said groups to a logical device on the basis of their respective access densities.

DESCRIPTION OF THE PREFERRED EMBODIMENT

Figure 1:
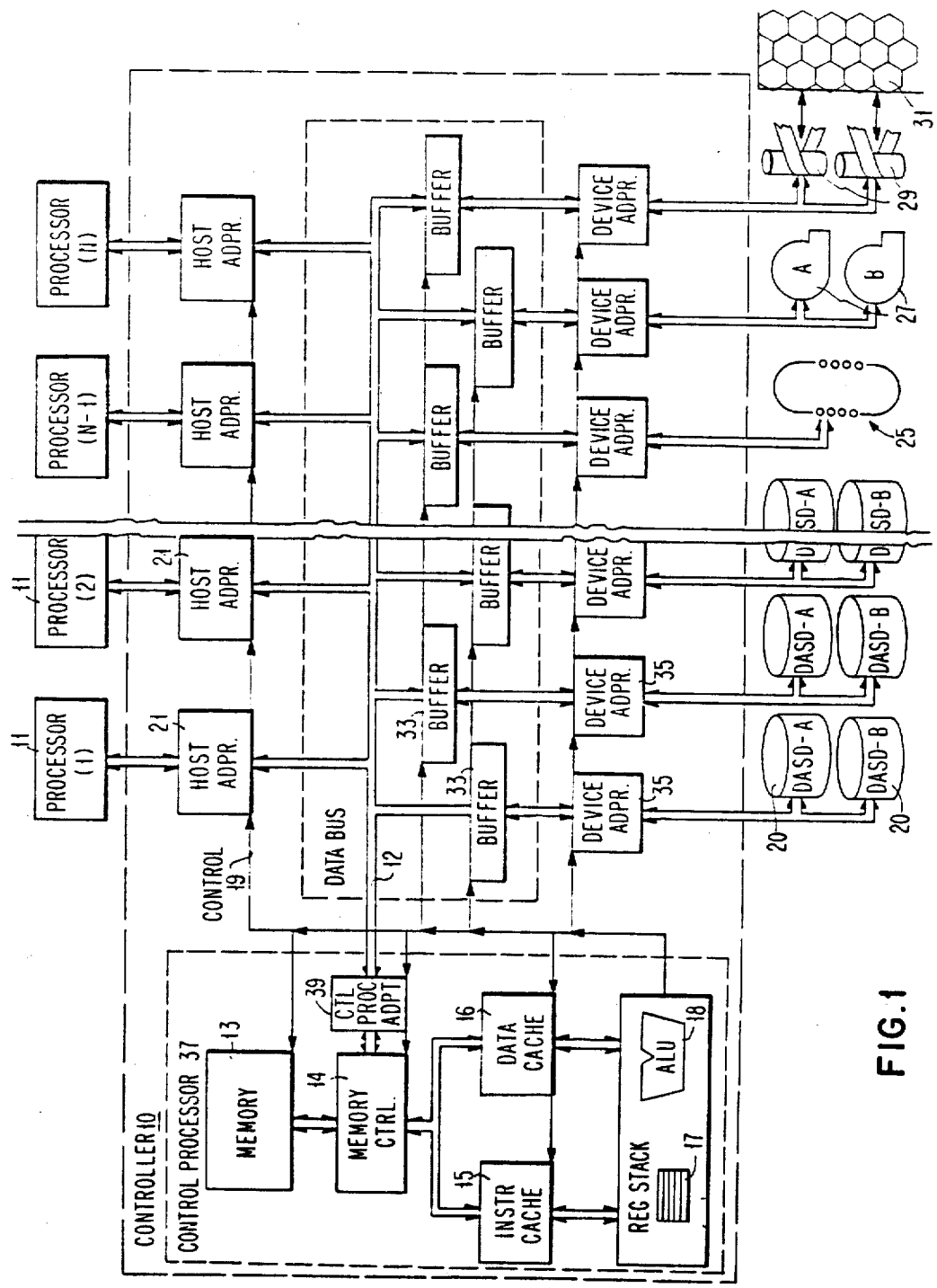
FIG. 1 is a schematic diagram of a data storage system showing a plurality of devices having different storage characteristics.

Referring to FIG. 1, an example is given of a multiprocessor system wherein data storage functions may be contained in a storage system including a controller 10 and a plurality of storage devices 20, 25, 27, 29, 31. Controller 10 comprises a control processor 37 and a plurality of host adapter modules 21, buffers 33, and device adapter modules 35. Under the control of control lines 19, data on data buses 12 is transferred between processors 11, devices 20, 25, 27, 29, and 31, and control processor 37. Control processor 37 includes a main memory or storage module 13, a memory controller 14, and instruction cache 15 and data cache 16, and a central processor including a register stack 17 and arithmetic logic unit (ALU) 18. Control processor adapter 39 interfaces control processor 37 to data bus 12, memory controller 14 directs data to and from data bus 12, memory 13, instruction cache 15, data cache 16. Storage functions executed by control processor 37 may include device attachment, data set creation, data set placement, device partitioning, data storage, data retrieval, and table maintenance. Those functions specifically related to the invention will be further described hereafter. Alternatively, all or some of these functions may be performed in a host 11. Host 11 may be a stored program controlled digital computer of the type described in U. S. Pat. No. 3,400,371 by G. M. Amdahl, et al, entitled "Data Processing Systems", and in IBM System/370 Principles of Operation, IBM Publication GA22-7000, the teachings of which are incorporated herein by reference. The storage system of FIG. 1 accommodates multiple devices having different access characteristics, and is best utilized in such an environment. Devices 20 comprise direct access storage devices, device 25 may comprise a bubble or charge coupled device (CCD) storage device, devices 27 may comprise a magnetic tape storage device, device 29/31 may comprise a mass storage subsystem (MSS) or library storage device.

Figure 2:
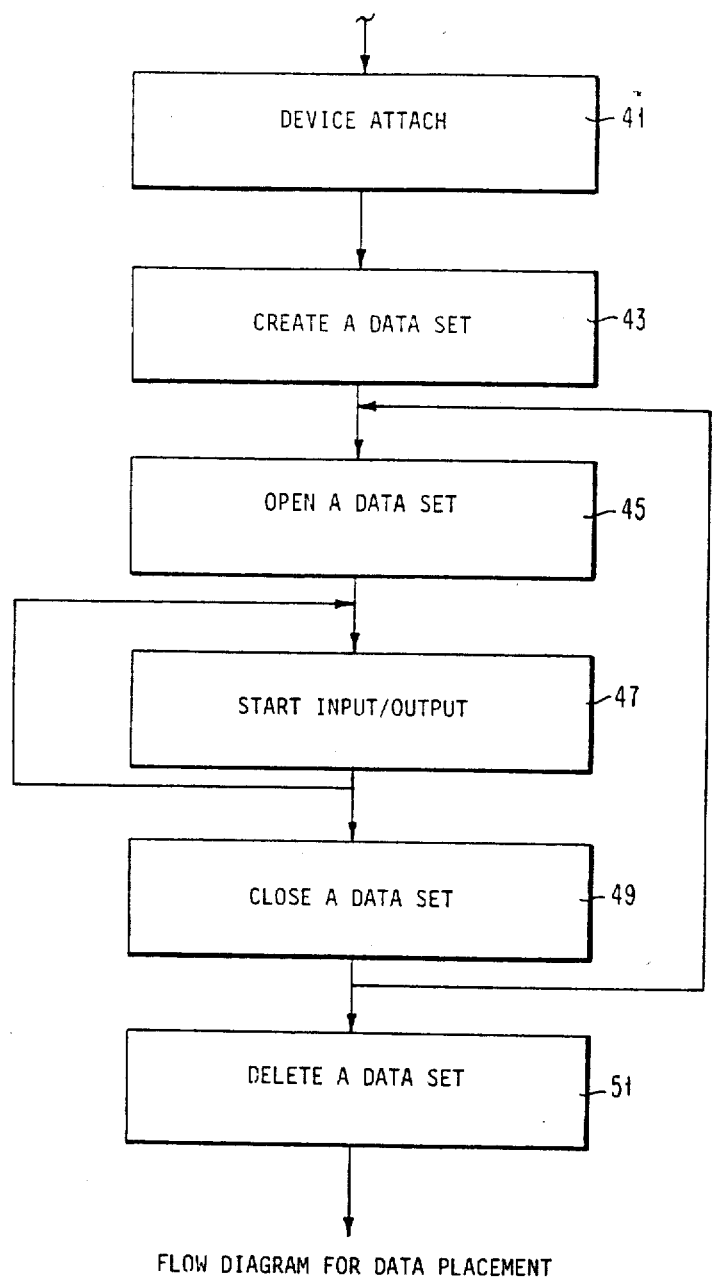
FIG. 2 is a high level flow diagram illustrating the data placement procedure of the invention.

Referring to FIG. 2, an overview flow diagram is presented of the data placement procedure of the invention. As will be more fully described hereafter in connection with FIGS. 8–11, the procedure includes device attach step 41 (FIG. 8), create a data set step 43 (FIG. 8), open a data set step 45 (FIG. 9), start input/output step 47 (Figure 10), close a data set step 49 (FIG. 11), and delete a data set step 51.

Figure 3:
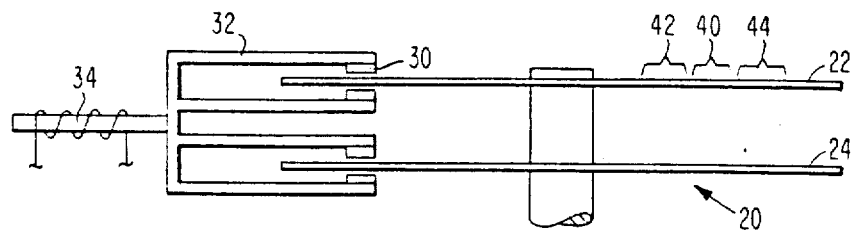
FIG. 3 is a schematic side view of a direct access storage device including two storage disks.
Figure 4:
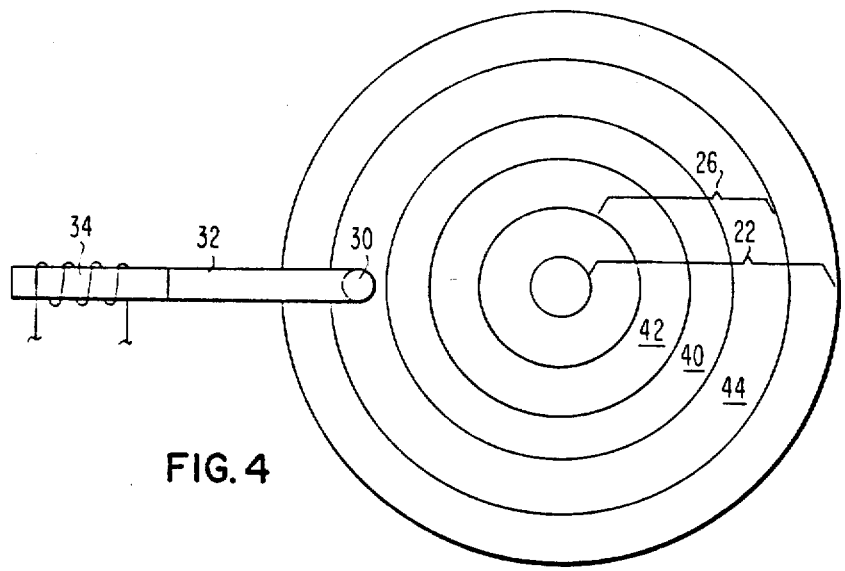
FIG. 4 is a top view thereof.

Referring to FIGS. 3 and 4, there is illustrated a disk storage device 20 including two disks 22 and 24. Each disk 22, in this example, is coated with an upper and lower magnetic recording surface, such as 26, in which data signals may be written and from which they may be read by read/write transducer 30, mounted on actuator arm 32. The transducers 30 are positioned to a data track within bands of tracks, or partitions, 40, 42, 44 by actuator driver 34. One embodiment of this invention relates to the partitioning of device 20 data recording surfaces 26 into high access and low access partitions 40 and 42, 44, respectively, and to the allocation of data records to these partitions based upon the storage characteristics of the data. Other device types may be similarly partitioned based upon their unique physical storage characteristics.

The "storage characteristics" of data are represented, herein by the access density of the data, which is determined by the applications which access the data. "Access density" is defined as the number of accesses per unit of time divided by storage capacity or data volume, where the time may be expressed as seconds and the capacity or volume as megabytes (millions of bytes, where a byte is 8 binary bits.) Thus, the access density of a data storage device is equal to the number of accesses per unit of time (seconds) the device can sustain, divided by the storage capacity of the device (megabytes). And, the access density of an application is equal to the number of accesses per unit of time the application requires to data stored on external devices, divided by the volume of data which it may access. Typical access density values may be between 0.001 and 10 for DASD devices 20, greater than 10 for CCD devices 25, and less than 0.001 for MSS devices 29,31.

In accordance with the invention, device partitioning and data placement procedures are based upon storage characteristics of data, as characterized by access density.

Device partitioning is accomplished by dividing the total storage capacity ($C_T$) of device 20 into several capacity parts, with each capacity part ($C_{PN}$) comprising a plurality of adjacent tracks or cylinders on the recording surfaces 26. Storage accesses are then allocated to each of the capacity parts ($C_{PN}$) in such a way that the total accesses ($A_T$), consisting of the sum of all access parts ($A_{PN}$) do not exceed the sum of the accesses the device is able to sustain.

Thus, the total capacity ($C_T$) is expressed as the sum of the capacity parts ($C_{PN}$), as follows:

$$C_T = C_{P1} + C_{P2} + \ldots + C_{P(N-1)} + C_{PN} \quad (1)$$

And total accesses ($A_T$) is expressed as a sum of the accesses to each of the parts, as follows:

$$A_T = A_{P1} + A_{P2} + \ldots + A_{P(N-1)} + A_{PN} \quad (2)$$

By definition, the access density of a device ($D_B$) is equal to the accesses ($A_T$) divided by the capacity ($C_T$), as follows:

$$D_B = A_T/C_T = \sum_{V=1}^{N} A_{PV} / \sum_{W=1}^{N} C_{PW} \quad (3)$$

As a result, a single device 20 having a single access density can be utilized in such a way as to appear as N devices having M different access densities where M is equal to or less than N. In the example herein illustrated as one practical implementation of the invention, M=N=2.

Figure 5:
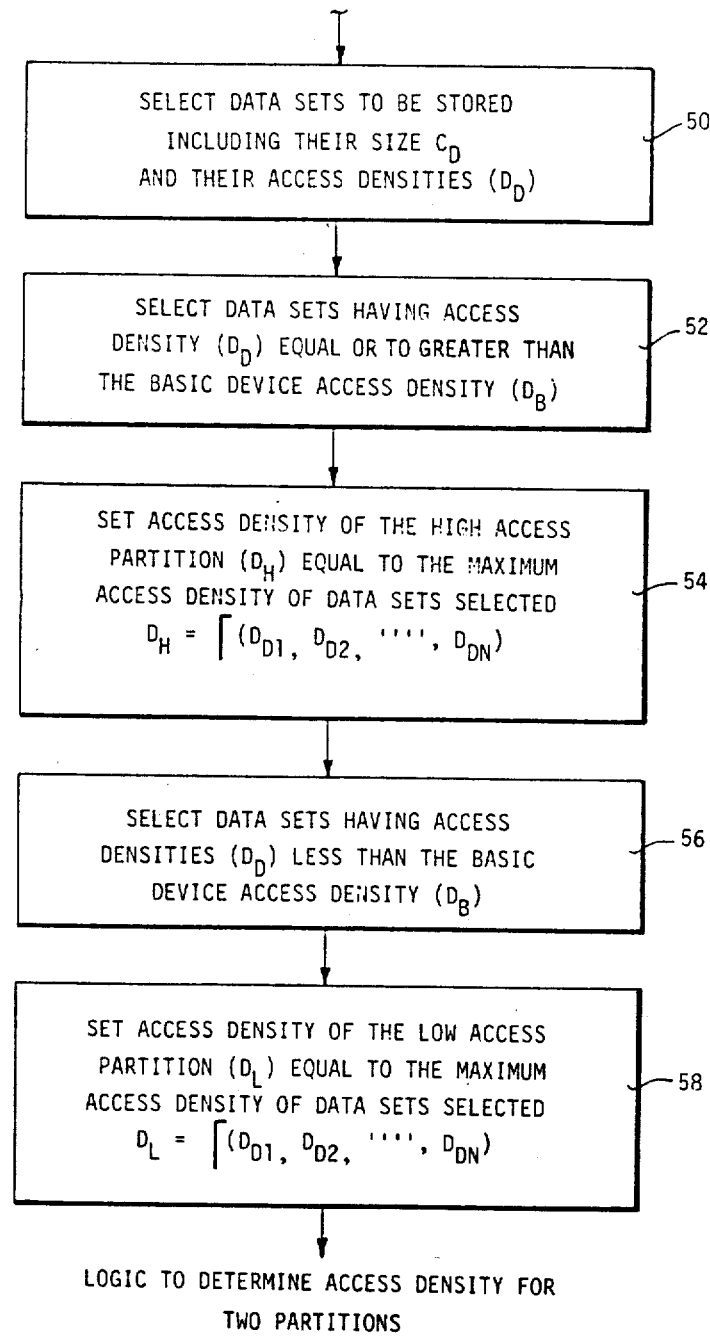
FIG. 5 is a logic flow diagram illustrating the procedure of the invention for determining the access density for two partitions.

Referring now to FIG. 5 in connection with Table 1, an explanation will be given of the procedure of the invention for determining access density for a two partition (N=2) system. In Table 1 is set forth an example entry for one data set in a data set control block (DSCB), which is an improvement on the DSCB described in OS/VS2 System Programming Library Debugging Handbook Vol. 2, IBM Publication GC28-0709, pages 375-385. The DSCB (and the UCB described hereafter) may be stored in memory 13 of controller 10, or at host 11. A VTOC (also described hereafter) may be stored on each device, and copied into memory 13 when required. There is one such entry for each data set being managed, and includes the data set name, access density, and size. The access density field contains the access density of the data ($D_D$) in the data set: the number of accesses per second divided by the number of megabytes in the data set ($C_D$). The access density field may initially be estimated by the user or set in accordance with past experience with the data set, and thereafter modified by actual experience.

TABLE 1

| DATA SET CONTROL BLOCK (DSCB) | | | |
|---|---|---|---|
| OFFSET | TYPE | LENGTH | DESCRIPTION |
| 0 | CHAR | 44 | DATA SET NAME |
| ... | ... | ... | ... |
| 78 | HEX | 4 | ACCESS DENSITY ($D_D$) |
| ... | ... | ... | ... |
| | | | SIZE (CAPACITY, $C_D$) |
| 94 | HEX | 4 | ALLOCATION |
| 98 | HEX | 3 | LAST USED TRACK |
| 101 | HEX | 2 | BYTES REMAINING |
| ... | ... | ... | ... |

TABLE 2

| UNIT CONTROL BLOCK (UCB) | | | |
|---|---|---|---|
| OFFSET | TYPE | LENGTH | DESCRIPTION |
| ... | ... | ... | ... |
| 5 | SIGNED | 1 | BINARY UNIT ADDRESS |
| ... | ... | ... | ... |
| 19 | CHAR | 1 | DEVICE CODE |
| ... | ... | ... | ... |
| -WW | SIGNED | 3 | DEVICE CAPACITY |
| -XX | SIGNED | 3 | CYLINDER OFFSET ADDRESS ($A_O$) |
| -YY | SIGNED | 3 | TOTAL HIGH ACCESS CYLINDERS ($T_H$) |
| -ZZ | SIGNED | 6 | ACCESS DENSITY ($D_B$) |

Referring now to FIG. 5, the partitioning of a device proceeds as follows. In step 50, the data sets to be allocated to (stored on) the device are selected, and their access densities ($D_D$) and capacities ($C_D$) determined from the Data Set Control Block (DSCB, Table 1). The selected data sets are, in steps 52 and 56, grouped such that the access densities of one group will be equal to or greater than the basic device access density ($D_B$), with the access densities of the other group less than $D_B$.

In step 54, from the group of data sets having access densities ($D_D$) equal to or greater than the basic device access density ($D_B$), an access density such as the highest, is selected to be the access density ($D_H$) of the high access partition 40. In step 58, from the group of data sets having access densities ($D_D$) smaller than the basic device access density ($D_B$) an access density, such as the highest, is selected to be the access density ($D_L$) of the low access partition 42, 44.

Figure 6:
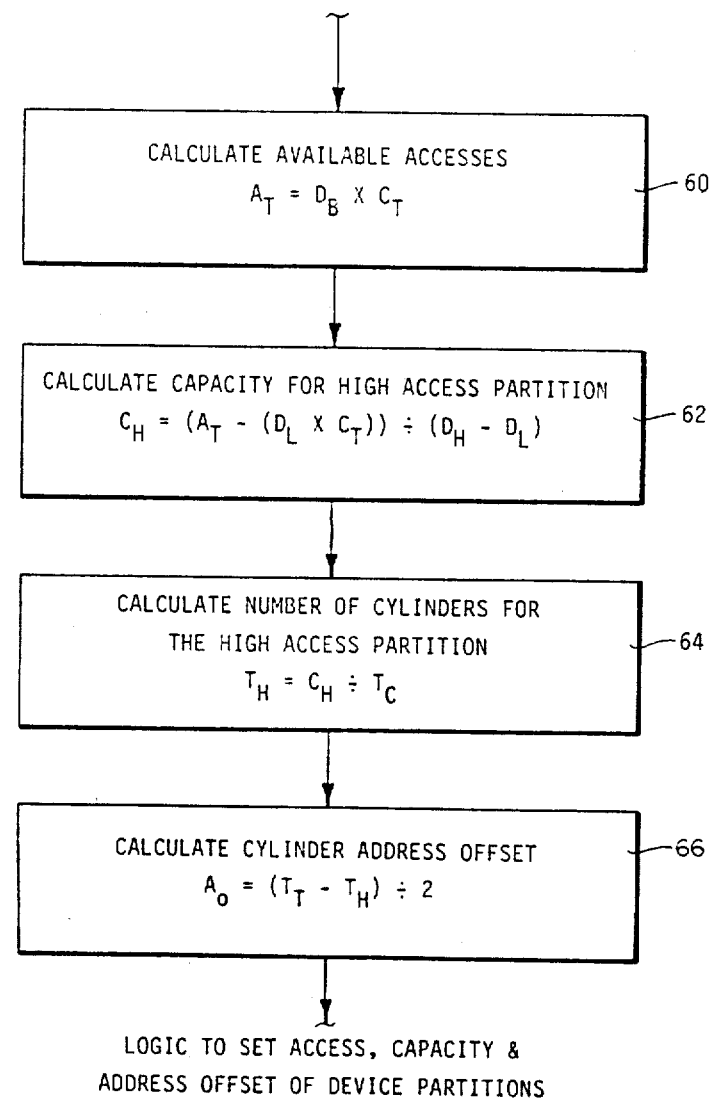
FIG. 6 is a logic flow diagram illustrating the procedure of the invention for setting the access, capacity, and address offset of device partitions.

Referring next to FIG. 6, the total capacity ($C_T$) of the data storage device 20 having a basic access density ($D_B$) is partitioned to provide the required capacity ($C_H$) for the high access partition 40, and the required capacity ($C_L$) for the low access partition by solving the following three simultaneous equations in three unknowns (the unknowns being $A_T$, $C_H$, and $C_L$):

First, in step 60, the available accesses ($A_T$) are calculated by multiplying the basic access density ($D_B$) of the device by the total capacity ($C_T$) of the device:

$$A_T = D_B * C_T \quad (4)$$

Second, in step 62, the capacity ($C_H$) for the high access partition is calculated by subtracting the product of the access density ($D_L$) of the low access partition 42, 44 and the total capacity ($C_T$) of the device 20 from the total accesses ($A_T$). This result is then divided by the access density ($D_H$) of the high access partition 40 minus the access density ($D_L$) of the low access partition 42, 44:

$$C_H = (A_T - (D_L(C_T))/(D_H - D_L) \quad (5)$$

Third, the capacity ($C_L$) for the low access partition 42, 44 is calculated by subtracting the capacity ($C_H$) of the high access partition 40 from the total capacity ($C_T$) of device 20:

$$C_L = C_T - C_H \quad (6)$$

The capacity ($C_H$) high access partition 40 having been calculated in step 62, the number of cylinders ($T_H$) to be allocated to that partition is determined in step 64 by dividing the capacity ($C_H$), expressed in millions of bytes, for example, by the cylinder capacity ($T_C$), which is the capacity of a cylinder in device 20.

$$T_H = C_H/T_C \quad (7)$$

A cylinder is the set of all recording tracks on recording surfaces 26 of all disks 22, 24 being scanned by transducers 30 for a given position of actuator 32. Thus, there are as many cylinders on device 20 as there are tracks on a single recording surface 26.

To minimize the travel distance of the actuator 32, 34 to position transducer 30 over a desired track, the high access partition 40 comprising the $T_H$ cylinders is positioned as a band 40 in the center of the recording surface 26, as is best illustrated in FIG. 4. This is accomplished in step 66 by calculating a cylinder address offset ($A_O$) for the high access partition 40 by subtracting one half of the number of cylinders ($T_H$) required for the high access partition from one half of the total cylinders ($T_T$):

$$A_O = *(T_T - T_H)/2 \qquad (8)$$

The two partitions are then defined to the system processor as two unique devices, each having a unique identifier, number of cylinders, cylinder address offset, and level of partition. In the embodiment herein described, the physical device 20 identity is preserved by the use of a binary unit address, as is illustrated in the Unit Control Block (UCB) of Table 2. The UCB of Table 2 is an improvement of the Unit Control Block described in OS/VS2 System Programming Library Debugging Handbook Vol. 3, IBM Publication GC28-0710, pages 454-494, and OS/VS2 MVS Overview, IBM Publication GC28-0984, pages 4-11.

Figure 7:
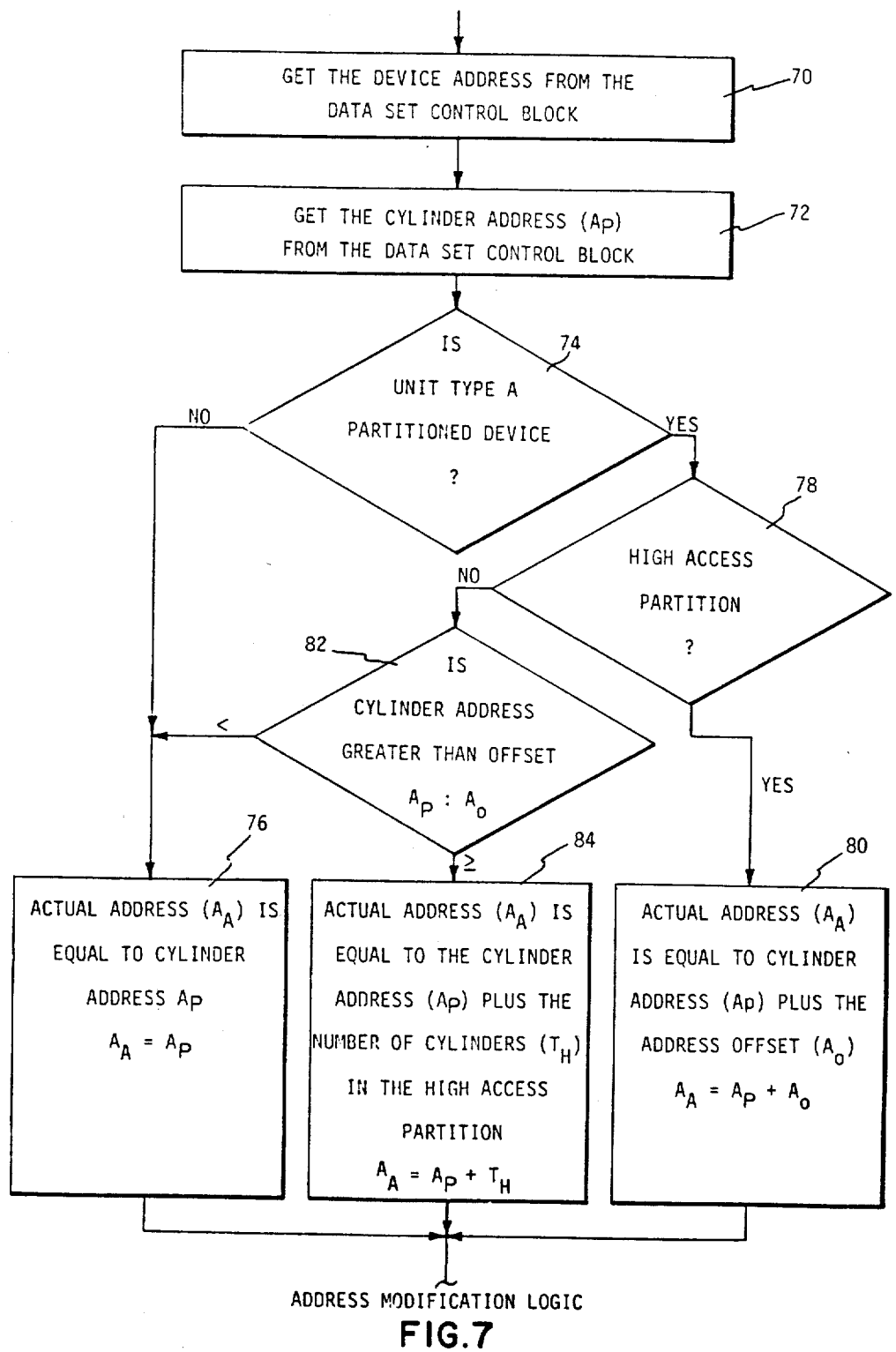
FIG. 7 is a logic flow diagram illustrating the address modification logic of the invention.

Referring now to FIG. 7, when a data record is to be stored in or retrieved from a partitioned space, its storage address is developed, as is shown in steps 70 and 72, according to standard access method techniques. However, before completing the address calculation, the device type is checked in step 74. If it is not a partitioned device, according to step 76, the actual address ($A_A$) is set equal to the cylinder address ($A_P$) from the UCB (Table 2). If, however, the device is a partitioned device, the address modification procedure of steps 78-84 is required to preserve the partition. Each of the partitions is identified in the DSCB as a unique device. The actual physical unit 20 address is entered into the UCB for each of the partitions at the time the partition is defined to the system. This provides the correct physical device address to be generated at the time a data set is opened. In addition, a unique unit type code or device code is provided that identifies the device as a partitioned device and that identifies the device as the high access partition or the low access partition. The Unit Control Block of Table 2 illustrates an implementation appropriate for the IBM Multi-Virtual System (MVS) Operating System. The cylinder offset address ($A_O$) and the number of cylinders in the high access partition ($T_H$) are developed at the time the partitions are defined for a device 20 and entered into the UCB.

If the unit type code or device code in the UCB indicate, as is tested in step 78, that the device to be accessed is a high access partition, the actual physical cylinder address ($A_A$) is calculated in step 80 by adding the cylinder address offset ($A_O$) to the partitioned cylinder address ($A_P$):

$$A_A = A_P + A_O \qquad (9)$$

However, if the device code indicates the device to be referenced is a low access partition, as is illustrated by steps 82 and 76, the actual physical cylinder address ($A_A$) is the same as the partitioned device cylinder address ($A_P$) if the partitioned cylinder address ($A_P$) is less than the offset address ($A_O$). If, however, as is shown in steps 82 and 84, the partitioned cylinder address ($A_P$) is equal to or greater than the address offset ($A_O$), then the actual cylinder address ($A_A$) is equal to the partitioned cylinder address ($A_P$) plus the total cylinder count ($T_H$) in the high access partition:

$$A_A = A_P + T_H \qquad (10)$$

Having completed the address conversion to the actual physical device 20 address, the read/write transducer 30 can be positioned over the proper track (or cylinder), preserving the partition boundaries. Thus, two virtual device types are apparent to the system that more nearly match the storage characteristics (volume and frequency of access) of the data to be stored. This results in more cost effective data storage.

As above described, in connection with FIGS. 5-7, the device 20 is partitioned into two logical devices having different access characteristics at the time device 20 is defined to the system based upon the access density of the data sets which the two logical devices will be storing. By a further aspect of the invention, data is maintained on that logical device which substantially or most nearly meets the storage characteristics of the data, where those storage characteristics may vary with time. Thus, data will be placed on one or more devices 20 in such a way that heavy utilization of particular data sets is handled by the system without undue degradation (i.e., without device bottleneck), and the cost of storage of data records will be held to a minimum by the more effective utilization of storage device(s) 20.

As previously defined, the access density of a data set (a collection of data records) is equal to the number of accesses by the system to the data records in the data set divided by the volume (for example, number of megabytes of data records) in the data set.

According to this aspect of the invention, at the time a data storage device is attached to a data storage system, the access density of the device is entered into a table which includes the device address, capacity, and access density. At the time a data set is created, an estimated access density for the data set, based on the application requiring that data, is entered into a table which includes the data set name, data set location, application identifier, capacity, and access density. Application identifier and data set access density appear for each application using the data set. Space is then reserved on the device that has available space most nearly or substantially matching the access density of the data set. At the time an application signals the use of a data set (that is, at allocation time during opening of a data set), the data set table is referenced to determine the location of the data, the access density of the data set for the application, and the data set size. The device table is referenced to determine the access density of the device containing the data set. In the case of a multiprocessing or a multiple processor environment, the access density required for a data set will be the sum of the applications operating concurrently. The access density of the device is then compared to the access density of the data set. If the two fall within specified limits of each other, the data set is left on the device first addressed, and is ready for processing. If the limits are exceeded, the data set will be moved to a device that more nearly meets the characteristics of the data set.

During the input/output activity, the system collects a count of the references to the active data sets, and at specified intervals of time recalculates the actual access density of the data set (by dividing the accumulated accesses count for a given data set by the capacity of the data set expressed in megabytes times the number of seconds in the specified interval). If the newly calculated access density for the data set does not fall within the specified limits of, or is substantially different from, the current data set access density found in the data set table, the tabled value for access density is replaced by the new calculated value. When a data set is no longer required for processing (that is, it is closed), the data set will remain on the device that most nearly matches its active characteristics until such time as space is required on that device by another data set having a comparable access density but found to reside on a device having a lower access density than required at the time it became active. The subject data set will then be moved to a device of lower access density to reside there until it becomes active again.

Herein, the devices of different access density may be a plurality of physical devices of different characteristics, and may also include physical devices which have been partitioned into logical devices exhibiting different characteristics, as previously described.

According to one particular implementation of this aspect of the invention using the IBM MVS operating system, the data set storage characteristics are continuously monitored by the system while in operation, and those characteristics are updated, such as by storage in the Data Set Control Block (DSCB), Table 1.

Figure 8:
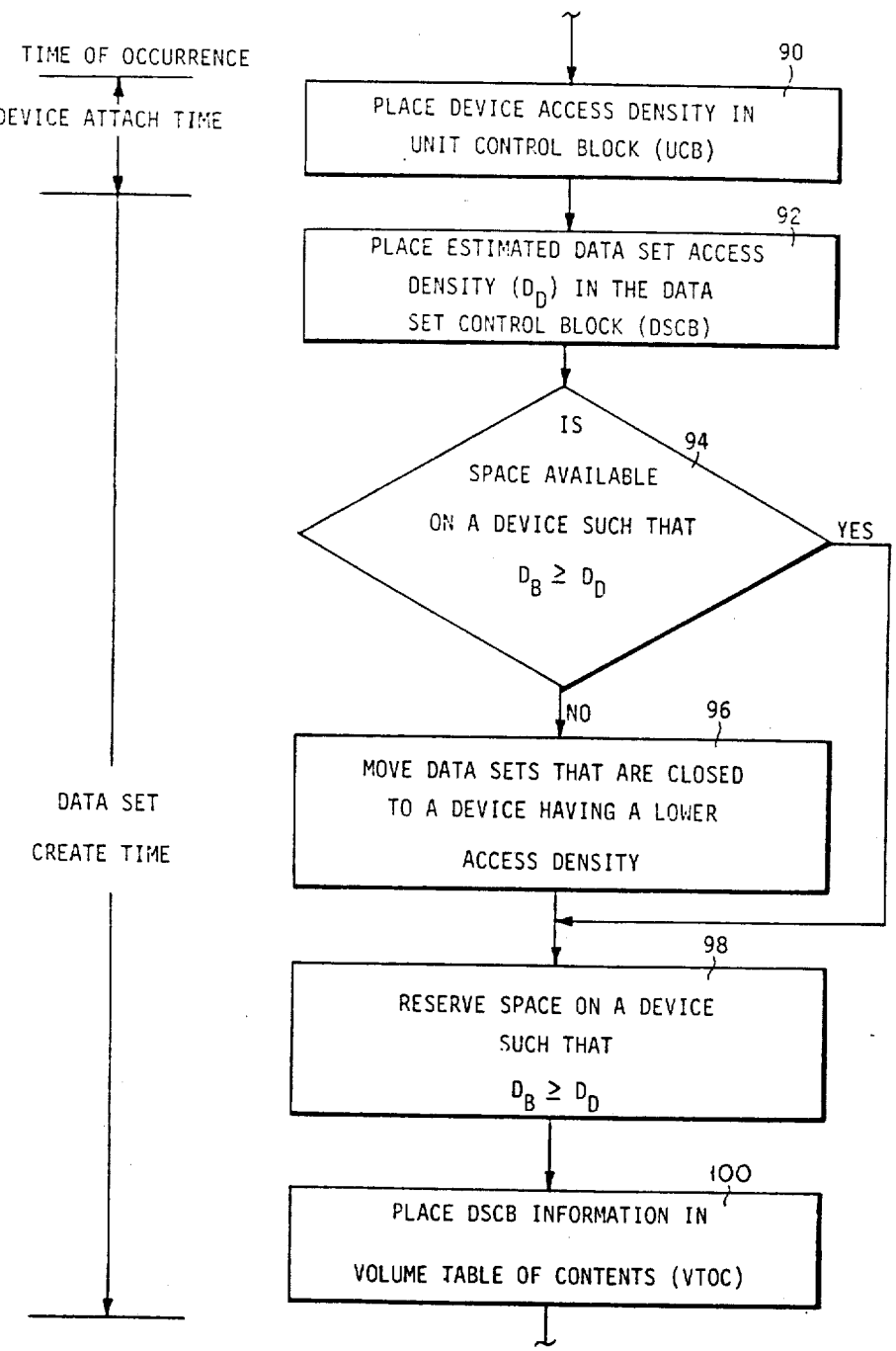
FIG. 8 is a logic flow diagram illustrating the data placement procedure steps of the invention executed at device attach and data set create times.

Referring to FIG. 8, step 90, at the time a data storage device 20 is attached to the system, the device access density ($D_B$) is placed in the Unit Control Block (UCB, Table 2). Steps 92–100 are performed at the time a data set is created. In step 92, an estimated data set access density ($D_D$) is placed by the user, or creator of the data set, in the Data Set Control Block (DSCB). Next, in steps 94–100, space is reserved for the data set on a device that has available space with an access density ($D_B$) most nearly matching the access density ($D_D$) of the data set, with $D_B$ equal to or greater than $D_D$. If necessary to make room for the data set or for general maintenance of the device, in step 96 a closed data set may be moved to a device 20 having a lower access density ($D_B$). In step 100, this DSCB information is placed in a Volume Table of Contents (VTOC), which is a data set maintained by the system on a storage device to describe the device and its contents. At data set open time (more specifically, at the time of allocation), the data set access density ($D_D$) is obtained from the VTOC, the device access density ($D_B$) is obtained from the UCB, and these access densities are compared. If they are equal within some predetermined limit, the data set is ready for processing. If, however, the difference of the two access densities $D_B$ and $D_D$ is greater than that limit, then the system will move the data set to an available device that more nearly meets the characteristics of the data.

Figure 9:
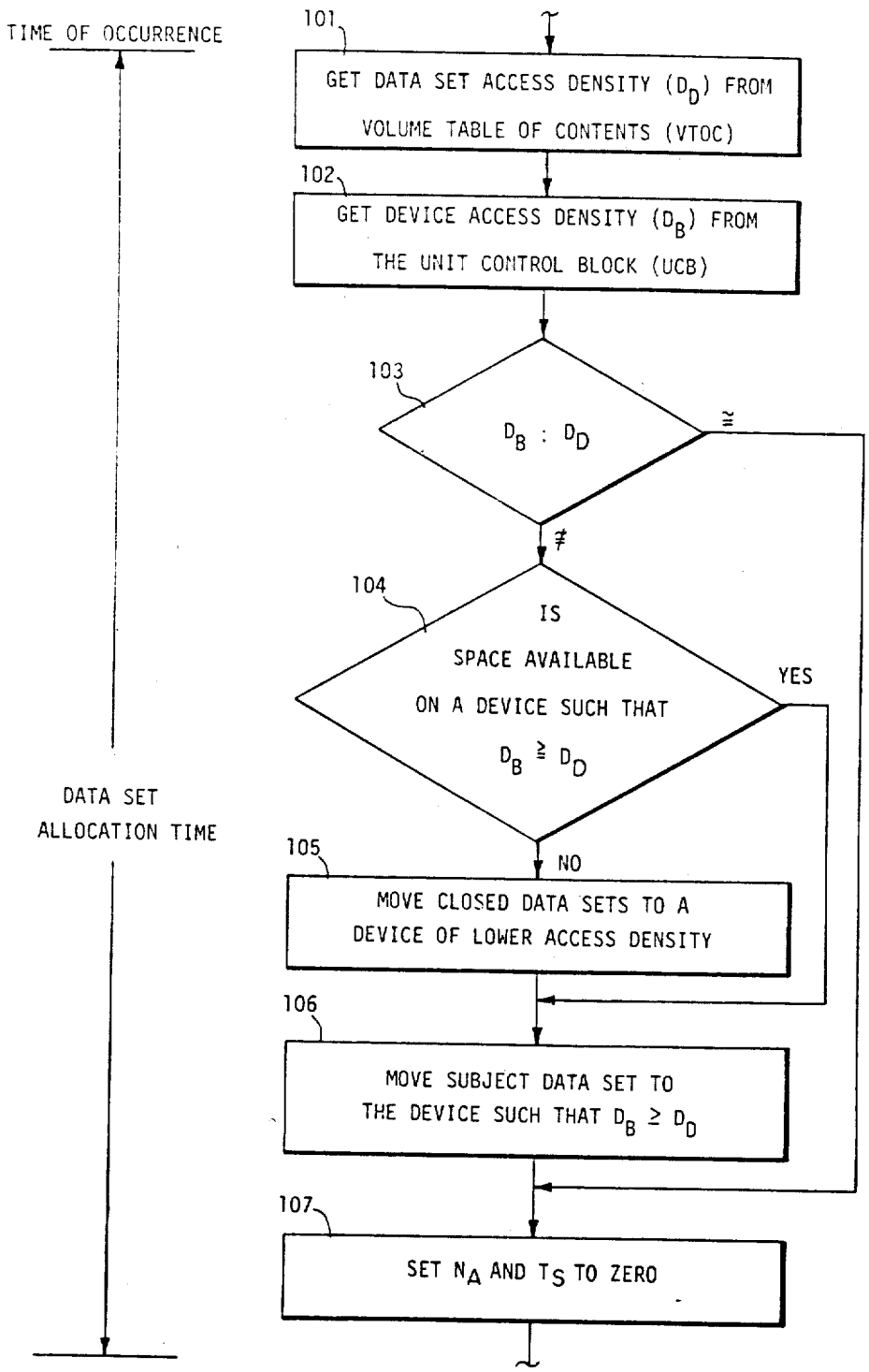
FIG. 9 is a logic flow diagram illustrating the data set placement steps executed at data set allocation time.

Referring to FIG. 9, steps 101 to 107 are completed by the system during open time, when the data set is being allocated. Logical step 101 obtains the data set access density ($D_D$) from the volume table of contents (VTOC). During step 102, the device access density ($D_B$) is obtained from the unit control block. Then during step 103 the access density ($D_B$) of the device containing the data set is compared to the access density ($D_D$) of that data set. If the two fall within specified limits of each other, processing proceeds to step 107. If not, processing advances to step 104. This step searches for available space on a device having the proper characteristics. If space is found, step 106 is executed, moving the data set being opened to that device. However, if space is not available, step 105 will be processed, moving closed data sets to provide the required space before processing moves to step 106. Finally, step 107 is executed to initialize the access count ($N_A$) and the elapsed time ($T_S$) to zero.

At start I/O time, the system monitors the activity against a data set by collecting the activity count for the data set. If the specified time has elapsed, the actual access density of the data set is calculated. And if the newly calculated access density is beyond specified limits, the data set access density ($D_D$) is replaced in the DSCB and the VTOC.

Figure 10:
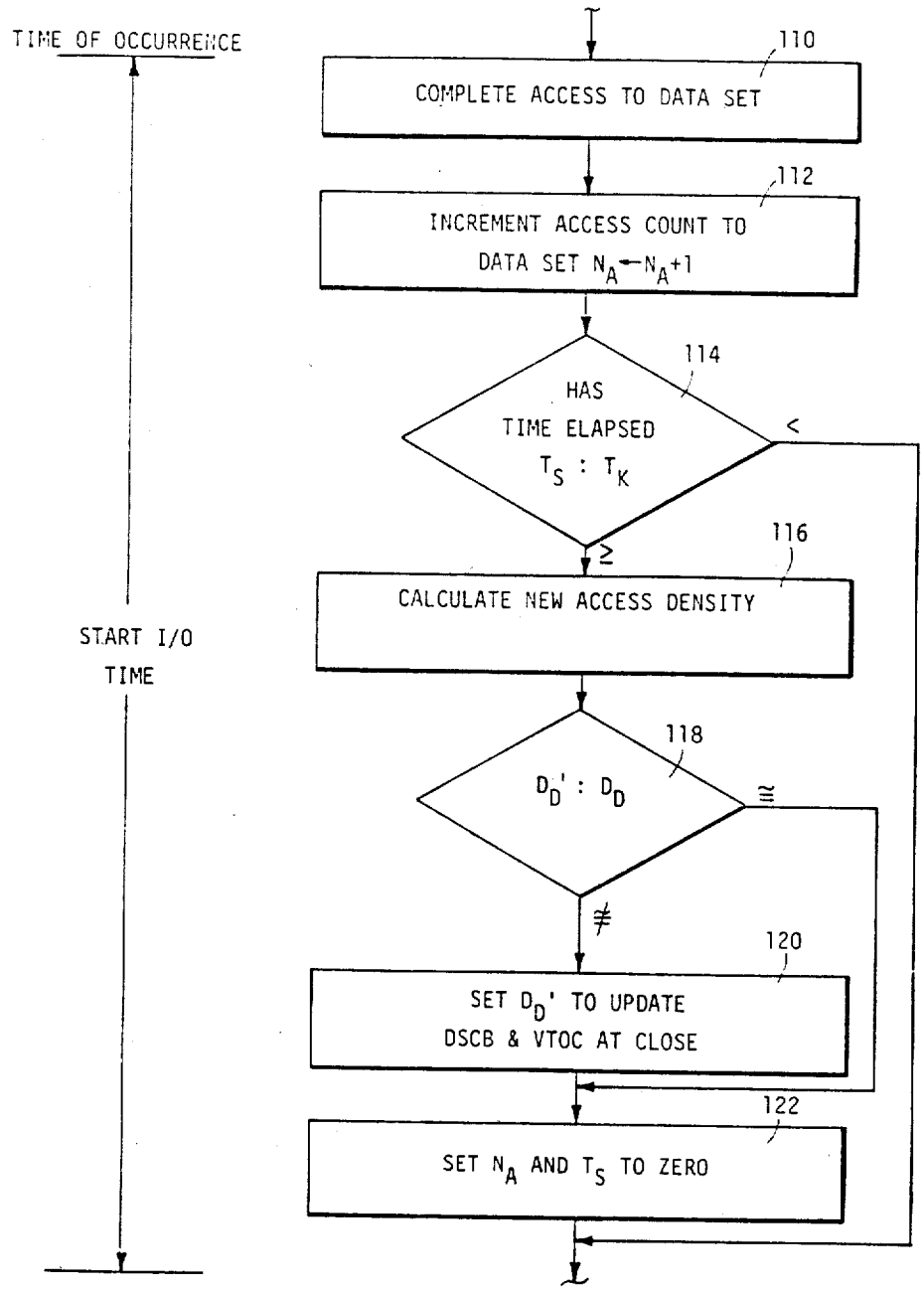
FIG. 10 is a logic flow diagram illustrating the data placement procedure steps of the invention executed at start I/O time.

Referring to FIG. 10, steps 110–122 are executed by the system at start I/O time. Beginning with completion of access to the data set at step 110, to collect an activity, or access, the count ($N_A$) for the data set is incremented. In step 114, a test is made to determine if the time elapsed ($T_S$) since the access count was reset exceeds some predetermined value $T_K$. If the time has elapsed, step 116 is executed to calculate a new access density value ($D_D'$) for the data set. The new access density ($D_D'$) is calculated by dividing the access count ($N_A$) by the elapsed time ($T_S$), producing accesses/second, which is divided by the volume ($C_D$) in the data set to give the access density.

$$D_D' = (N_A/T_S)/C_D \quad (11)$$

Figure 11:
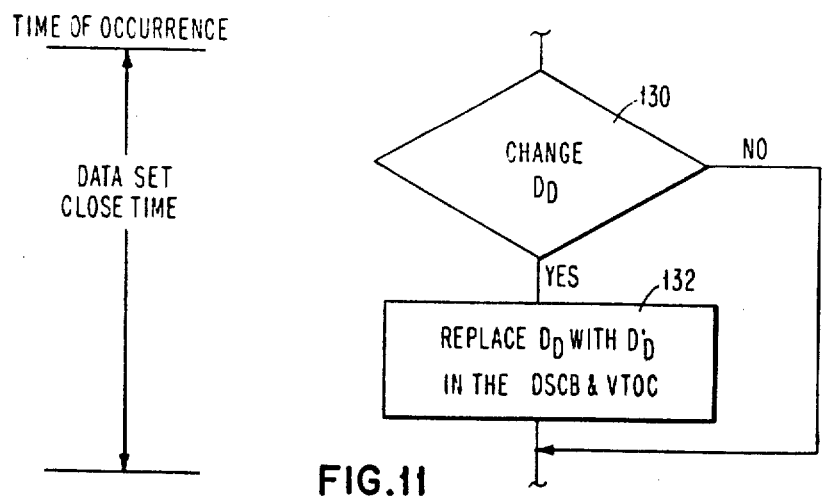
FIG. 11 is a logic flow diagram illustrating the data placement procedure steps of the invention executed at data set close time.

In step 118, if the new access density value ($D_D'$) varies significantly from the old ($D_D$), then a flag is set in step 120 to cause the new value $D_D'$ to be substituted for the old value at close (step 132). FIG. 11 sets forth the steps executed at data set close time where, if the update flag was set in step 120, the substitution of the new access density for the old is made in step 132 in the DSCB and VTOC. At data set close time, the data set will remain on the current device until such time as space is required on that device by a data set having a comparable access requirement but was found, in step 103, to reside on a device of lower access density ($D_D$ is greater than $D_B$) at the time it was opened. The closed data set will then be moved to a low access density device to reside there until it is opened.

The foregoing and other modifications may be made to the invention without departing from the spirit and scope thereof. For instance, the invention may be implemented in the MVS operating system, or in any operating system that utilizes data storage. Further, it may be implemented in the control of a self-sufficient data storage system, where many operating system data management functions are performed in a data storage system, rather than in the host processor.

I claim:

1. A method for operating a computing apparatus to automatically allocate data sets among storage devices in such a manner that system degradation will be minimized by reducing device bottlenecks and the cost of storage will be minimized by the effective ultization of storage device space and access capability, comprising the steps of:
    calculating the access density of a data set to be allocated as equal to the number of accesses per unit time to that data set divided by the data set volume;
    calculating the access density of each of a plurality of storage devices attached to the system as equal to the number of accesses that a device can sustain per unit time divided by the data storage capacity of the device;
    allocating the data set to a storage device that has sufficient available space and a device access density most nearly matching and exceeding the access density of the data set being allocated; and continuously monitoring and recalculating the data set access density and reallocating the data set as required to maintain the data set on a device having the most nearly matching access density.

2. The method of claim 1, comprising the further sign responsive to a request for access to a particular logical device address of computing the physical device address to account for the partitioning of the device into high and low access density partitions.

3. A method for operating a computing apparatus to partition a single direct access storage device into a plurality of logical devices having different device characteristics matching the device performance required for a plurality of data sets, comprising the steps of:

selecting data sets to be stored on the physical device, and calculating for each data set its access density as a function of the rate of inquiries to the data set and the data set volume;

selecting data sets having access densities equal to or greater than the basic device access density for assignment to a partition designated to support a high access density, said device access density being calculated as a function of the rate of access which the device can sustain and its storage capacity;

setting the access density of the high access partition equal to the highest access density of the data sets assigned to the high access partition;

selecting data sets having access densities less than the basic device access density for assignment to a low partition designated to support low access density;

setting the access density of the low access partition equal to the highest access density of the data sets assigned to the low access partition; and partitioning the total capacity of the device between high and low access partitions such that the high access partition contains sufficient volume to yield the required access density.

4. A method for operating a computing apparatus to partition a storage device into a plurality of logical devices, comprising the steps:

calculating the access density of the device as equal to the total accesses per unit time sustainable by the device divided by the total storage capacity of the device;

determining for each of a plurality of data sets to be stored on said storage device a data set access density equal to the total accesses per unit time to be made to that data set divided by the volume of data allocated to a data set;

allocating the data sets to at least two groups based upon their access densities, and assigning to each group an access density value related to the access densities of the assigned data sets;

partitioning the device into a plurality of logical devices of different access densities, where the sum of the access densities of the logical devices equals the access density of the storage device; and assigning each of said groups to a logical device on the basis of their respective access densities.

5. A method for operating a stored program digital computer to store and access data records from a plurality of data sets on a direct access storage device of the type having a plurality of concentric data storage cylinders, where a cylinder comprises a one or more tracks, comprising the steps of:

partitioning the storage device into a plurality of partitioned devices including a first partitioned device having at least first and second cylindrical parts and a second partitioned device including a third cylindrical part concentric with and contained within said first and second cylindrical parts;

determining the access densities of a plurality of data sets each as a function of the rate of inquiries to the data set and the data set volume; and storing in said first partitioned device data records in one or more data sets having one predetermined range of access densities and in said second partitioned device data records in one or more data sets having a different predetermined range of access densities greater than that of said one range.

6. A method for operating a stored program digital computing apparatus to store and access data records from a plurality of data sets on a plurality of at least two storage devices, comprising the steps of:

determining the access densities of at least a first and a second storage device each as a function of the rate of accesses which the respective device can sustain and its storage capacity, the access density of the first storage device being greater than the access density of the second storage device;

determining the access densities of a plurality of data sets each as a function of the rate of inquiries to the data set and the data set volume; and storing in said first storage device data records in one or more data sets having one predetermined range of access densities and in said second storage device data records in one or more data sets having a different predetermined range of access densities lower than that of said one range.

7. The method of claim 6, further comprising the steps of monitoring the actual access density of data sets stored in said first storage device; and responsive to the actual access density of a given data set becoming substantially less than the access density of said first storage device, moving said given data set to another storage device.

8. Apparatus for storing and accessing data records in a plurality of data sets, comprising:

direct access storage device means having a plurality of concentric data storage cylinders, each cylinder comprises one or more tracks, for storing data signals; said storage device means further comprising first partitioned device means having at least first and second cylindrical parts and second partitioned device means including a third cylindrical part concentric with and contained within said first and second cylindrical parts;

means for determining the access densities of a plurality of data sets each as a function of the rate of inquiries to the data set and the data set volume; and means for storing in said first partitioned device means data records in one or more data sets having one predetermined range of access densities and in said second partitioned device means data records in one or more data sets having a different range of access densities higher than that of said one range.

9. The apparatus of claim 8, further comprising:

means for determining the device access density of said second partitioned device means as a function of the rate of accesses which the device can sustain and its storage capacity;

monitoring means for monitoring the actual access density of a data set as a function of time; and means responsive to said monitoring means for removing from said second partitioned device means a data set having an actual access density which is substantially lower than the device access density.

10. The apparatus of claim 9, further comprising:

means responsive to said monitoring means for moving from said first partitioned device means a data set having an actual access density which is substantially higher than the access density of the first partitioned device means.

11. The apparatus of claim 8, further comprising:

means for storing as a stored access density a determined access density of a given data set assigned to said second partitioned device means;

means for monitoring the actual access density of said given data set as a function of time;

means, responsive to said actual access density of said given data set becoming substantially different from said determined access density, for substituting the actual access density for said determined access density as the stored access density in said means for storing;

means for determining when space is required on said second partitioned device means; and means responsive to the stored access density for said given data set for moving said given data set to a partitioned device having an access density more nearly equal to said stored access density.

* * * * *